(12) United States Patent
Kurts et al.

(10) Patent No.: US 6,647,545 B1
(45) Date of Patent: Nov. 11, 2003

(54) METHOD AND APPARATUS FOR BRANCH TRACE MESSAGE SCHEME

(75) Inventors: Tsvika Kurts, Haifa (IL); Roman Surgutchik, Karkur (IL); Oded Lempel, Haifa (IL); Ittai Anati, Haifa (IL); Haim Lustig, Haifa (IL)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/503,879

(22) Filed: Feb. 14, 2000

(51) Int. Cl.[7] .......................... G06F 9/44; G06F 15/00; H02H 3/05
(52) U.S. Cl. .......................... 717/128; 714/30; 714/46; 714/38; 712/227
(58) Field of Search .................. 717/128, 124–127, 717/129–135; 714/30, 38, 41, 46, 712, 715, 718, 720, 724–725, 733–734, 738, 742; 712/227, 233–240; 711/210, 105; 716/4; 326/9

(56) References Cited

U.S. PATENT DOCUMENTS

| | | | | |
|---|---|---|---|---|
| 5,636,374 A | * | 6/1997 | Rodgers et al. | 712/230 |
| 5,652,856 A | * | 7/1997 | Santeler et al. | 711/105 |
| 5,889,981 A | * | 3/1999 | Betker et al. | 712/227 |
| 6,073,251 A | * | 6/2000 | Jewett et al. | 714/7 |
| 6,145,122 A | * | 11/2000 | Miller et al. | 717/129 |
| 6,331,957 B1 | * | 12/2001 | Kurts et al. | 365/201 |

OTHER PUBLICATIONS

"Pentium II Processor Developer's Manual—GTL+ Interface Specifications," Intel Publication 243502–001, Chapter 8 plus title page, Oct. 1997, 22 pages.

"Intel Architecture Software Developer's Manual—vol. 1: Basic Architecture—Introduction to the Intel Architecture," Intel Publication 243191, Ch. 2 plus title page, 1999, 14 pages.

"Intel Architecture Software Developer's Manual—vol. 3: System Programming: Debugging and Performance Monitoring," Intel Publication 243192, Ch. 15 + title page, 1999, 21 pages.

* cited by examiner

Primary Examiner—Hoang-Vu Antony Nguyen-Ba
(74) Attorney, Agent, or Firm—Blakely, Sokoloff, Taylor & Zafman LLP

(57) ABSTRACT

A processor includes a host interface unit capable of generating at least one branch trace message (BTM), the host interface unit is coupled to a memory so as to store the at least one BTM in the memory and the processor is embodied on an integrated circuit (IC).

20 Claims, 4 Drawing Sheets

US 6,647,545 B1

METHOD AND APPARATUS FOR BRANCH TRACE MESSAGE SCHEME

BACKGROUND

1. Field

This disclosure relates to microprocessor debug features.

2. Background Information

One debug feature of processors, such as microprocessors, that may be used, for example, by software driver developers or basic input output system (BIOS) developers, tracks the sequential execution of machine instructions or code, as it is often referred to in the art. Software drivers and BIOS are both well-known in the art. This tracking of code execution may be accomplished by employing branch trace messages (BTMs). These branch trace messages may indicate when a branch is taken in code execution. There are numerous reasons for the use of branches in code. For example, decision points in code execution typically employ such branches. Whether or not a branch is taken may depend on the result of such a decision. Typically, BTMs include information about where in the code the branch was taken from and where in the code the branch resumes execution. Where the branch was taken from may be referred to as the branch address and where in the code the branch resumes execution may be referred to as the target address. Instruction pointers, which are well-known in the art, typically reference the location of an instruction that is currently being executed by a processor or microprocessor. Such BTM schemes are currently employed, for example, in microprocessors such as Pentium® II Processors and Pentium® III Processors, which are available from Intel Corporation, 2200 Mission College Blvd., Santa Clara, Calif. 95052. However, as microprocessors become highly integrated, debugging code, such as software drivers, becomes more problematic because, depending, at least, on the architecture, for example, prior approaches to tracking code execution may no longer apply. Therefore, a need exists for alternative schemes of debugging computing systems, such as is done by following code execution flow with BTMs, for example.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Figure 4:
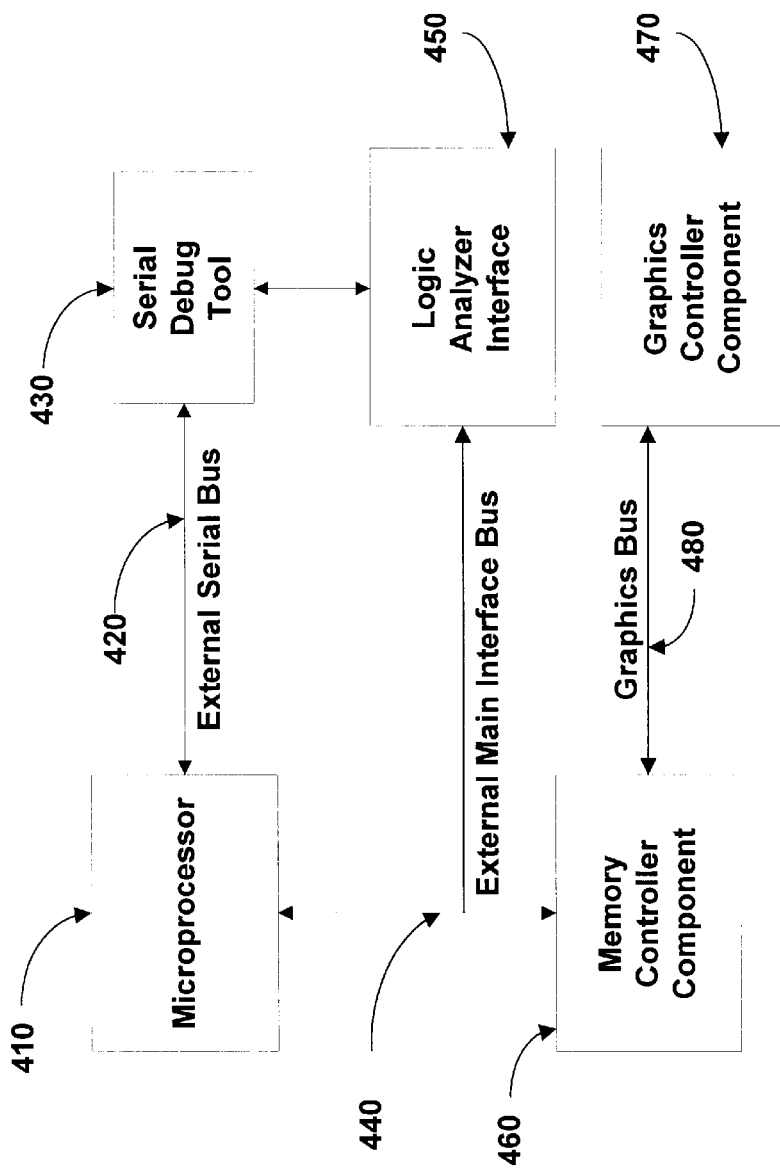
FIG. 4 is a block diagram of an embodiment of a prior art BTM scheme.

Current branch trace message (BTM) schemes typically allow access to such BTMs, in addition to other debug information, via an external main interface bus. This is illustrated in FIG. 4 by external main interface bus 440 of embodiment 400. Embodiment 400 is one example of a prior art BTM scheme that may be employed, for example, by software driver and BIOS developers in computing systems including a processor, such as a microprocessor, for example. In this particular embodiment, microprocessor 410 is coupled to external serial bus 420 and external main interface bus 440. In this context, external means external to the microprocessor component or module. In certain embodiments, a serial debug tool, such as 430, may be coupled to external serial bus 420. In such embodiments, serial debug tool 430 may comprise an In-target Probe (ITP) debug tool. ITP debug tools are a well-known serial debug tool, and are available, for example, from American Arium, 14811 Myford Road, Tustin, Calif. 92789.

In this embodiment, serial debug tool 430 and external main interface bus 440 are also coupled to logic analyzer interface (LAI) 450. Such an LAI may comprise a logic analyzer, which is a well-known hardware tool that may be used for microprocessor debug, for example. LAI 450 may further comprise software to interface the logic analyzer with external main interface bus 440. Such LAI software is also available from American Arium, for example. Such an LAI may be capable of detecting and storing, in memory buffers of the logic analyzer, for example, BTMs communicated by microprocessor 410 via external main interface bus 440. In such embodiments, serial debug tool 430 is also coupled to LAI 450 in order for these elements to operate cooperatively in performing various functions, such as employing a BTM scheme, for example. One disadvantage of this particular embodiment is that the logic analyzers typically employed for LAI 450 may be expensive and difficult to use.

As illustrated in FIG. 4, microprocessor 410 is coupled to external main interface bus 440. Such buses may be referred to as a front side bus (FSB). The external main interface bus is further coupled to memory controller component 460, which is in turn coupled to graphics controller component 470 via graphics bus 480, in this embodiment. Memory controller component 460 and graphics controller component 470 are typically further coupled, respectively, to a main memory (not shown) and a display device (also not shown). In embodiment 400, each of the elements illustrated in FIG. 4 is typically a separate component or device. In this regard, reducing the number of elements employed in a BTM scheme may be desirable for reducing cost and implementation complexity.

In embodiment 400 and similar embodiments, specific actions typically are taken within microprocessor 410 for it to transmit BTMs to other components, such as LAI 450, via external main interface bus 440. For this particular embodiment, for example, microprocessor 410 comprises a global configuration register, sometimes referred to as a machine status register (MSR). In this context, global means widely accessible within microprocessor 410 and not global to embodiment 400 as a whole. Such global configuration registers, e.g. MSRs, are well-known in the art.

For microprocessor 410, specific electronic messages may be transmitted to an MSR, which may result in enabling various operation modes or functions of the microprocessor, such as BTM mode, for example. In such embodiments, these electronic messages may be communicated to the MSR in a number of ways. For example, a specific software instruction may be executed by microprocessor 410 to write such a message. Alternatively, serial debug tool 430 may be used to communicate such a message to the MSR of microprocessor 410. Other ways of communicating with the MSR may also exist.

Once a specific electronic message to indicate that BTM mode is to be enabled is communicated to the MSR of microprocessor 410, since the MSR is global, certain electronic signals within microprocessor 410 may place the microprocessor in BTM mode. In this situation, the microprocessor may then begin transmitting BTMs at an appropriate point in its operation such as, for example, the completion of a currently being executed instruction. Alternatively, microprocessor 410 might enable BTM mode at the next microprocessor clock boundary. Other appropriate points for enabling BTM are possible and may depend, at least in part, on the particular embodiment, or the specific processor being employed.

As previously indicated, BTMs may assist software driver or BIOS developers, for example, in tracking the code execution flow of processor 410. As was also previously discussed, a BTM may comprise a branch address and a target address. A branch address typically references the code location of a branch decision. A target address typically references the code location that is executed after such a branch decision.

At a high level, once the microprocessor enters BTM mode, the contents of the instruction pointer related to a branch decision, such as a branch address and a target address, for example, are transmitted via external main interface bus 440 to components external to the microprocessor. If a branch address and a target address of such a BTM have consecutive instruction pointer addresses, this may indicate that a branch was not taken. In contrast, if a branch address and a target address have non-consecutive instruction pointer addresses, this may indicate that a branch was taken. In this context, consecutive instruction pointer addresses may, at least in part, depend on the specific instructions being executed. As was, previously indicated, instruction pointers are well-known in the art. This information, obtained from the instruction pointer and contained in such BTMs, may allow the determination of code execution flow. For example, BTMs may allow BIOS developers to determine which branches are being taken and which branches are not being taken during, for example, the boot sequence of a personal computer, although the invention is not limited in scope in this respect.

The boot sequence of a computer is typically when the elements of a BIOS and the elements of a system in which a microprocessor is employed are initiated. The elements of a BIOS may include, for example, input/output (I/O) controllers. Likewise, the elements of a system may include, for example, bus controllers or disk drive controllers. Elements of BIOS and of systems are, of course, not limited to the specific examples given and may include numerous other components or devices. While not limited to use for BIOS and boot sequence debug, BTMs are useful in such situations because, depending on the point or memory location in a sequence of instructions being executed in a computing system boot sequence at which an error occurs, many BIOS and system elements may not be initialized. BTMs allow the code execution flow to be followed in such situations to assist in determining the location of any errors so that they may be addressed. BTMs may also be employed for use in debugging other types of errors such as those occurring in operating system (OS) calls, software drivers and application software, as some examples. In these situations, BTMs may, for example, be used to determine whether a particular error is primarily attributable to hardware or software.

One trend in processor and microprocessor architecture is towards a higher level of integration. This trend includes, for example, integrating various system level elements in processor or microprocessor architecture, as is discussed in more detail hereinafter. Such integration may result in reduced system and overall integrated circuit complexity, which, in turn, may reduce system cost. Such results are potentially advantageous from a consumer perspective as they may allow for the availability of lower cost computer systems that employ such high-integration processors, for example.

One possible embodiment of a high-integration processor may comprise a memory controller and a graphics controller. As is illustrated in the prior art embodiment, 400, these controllers currently are typically physically separate from a processor, such as microprocessor 410. Integration of memory controller component 460, graphics controller component 470, and microprocessor 410 may in turn allow for elimination of external main interface bus 440. However, elimination of external main interface bus 440 would result in the disadvantage that debug information, such as BTMs, would no longer be accessible using the scheme illustrated in FIG. 4. Despite this disadvantage, the elimination of external main interface bus is desirable because this elimination may advantageously result in reduced system complexity by employing fewer components. This may, therefore, reduce overall integrated circuitry complexity and potentially overall system cost, as was previously discussed. Such an approach, however, fails to address obtaining debug information, including BTMs, as is desirable. As described below, embodiments in accordance with the present invention may, therefore, instead be employed to obtain this information.

Figure 1:
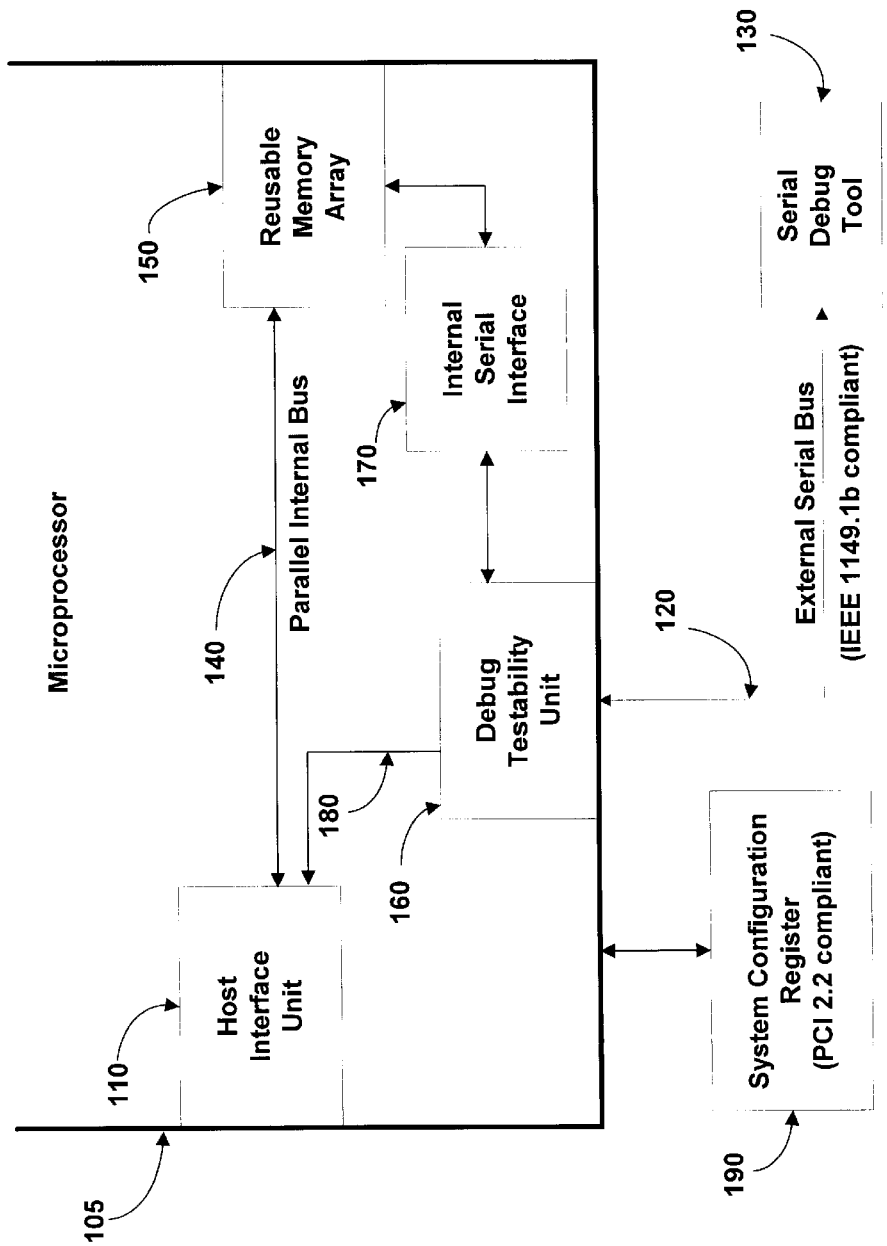
FIG. 1 is a block diagram illustrating an embodiment of a branch trace message scheme (BTM) in accordance with the invention.

FIG. 1 illustrates an embodiment, 100, of a branch target message scheme in accordance with the invention. The invention is, of course, not limited in scope to this or any particular embodiment. However, embodiment 100 addresses at least some of the challenges presented by high-integration processors in BTM schemes. Of course, the invention is not restricted in scope to the use of a high-integration processor or employing any particular processor or microprocessor.

Embodiment 100 also addresses at least some of the disadvantages of current embodiments, such as cost and difficulty of use. In this particular embodiment it is assumed microprocessor 105 comprises the following elements: host interface unit 110, parallel internal bus 140, reusable memory array 150, debug testability unit 160 and internal serial register interface 170. Such a microprocessor may be employed in this particular embodiment of a BTM scheme in accordance with the invention though, of course, the invention is not limited in scope to this, or any, particular processor embodiment.

As was previously indicated, in embodiments such as 100, a processor, such as microprocessor 105, may comprise a high-integration processor including a graphics controller and a memory controller. Integrating these controller functions with the functions of a processor, such as microprocessor 410, for example, may result in modifications to such a high-integration processor's architecture. These modifications may in turn affect the operation of specific functions of the processor or specific functions of systems in which such a processor is employed. For example, BTM schemes may be affected by changes such as the elimination of an external main interface bus. Therefore, to allow the use of a BTM mode in embodiment 100, for example, additional changes in the architecture of the processor may be employed. These architecture changes, which may be referred to as on-die BTM elements, are discussed in more detail hereinafter. Such BTM schemes may be referred to as on-die because, in BTM mode, BTMs may, at least temporarily, be stored on the processor or microprocessor die, as opposed to being communicated via an external main interface bus, as was discussed previously. The storing of BTMs on-die may address, for example, one or more of the disadvantages of prior art BTM schemes that include an LAI, such as 450.

While many alternatives exist for enabling on-die BTM elements, this particular embodiment, 100, may employ, for example, a system configuration register, such as 190. In this embodiment, system configuration register 190 may comprise a configuration register compliant with the peripheral component interconnect (PCI) local bus standard 2.2, though the invention is not limited in scope in this respect. The PCI local bus standard 2.2, issued Jan. 25, 1999, is well-known and available from the PCI Special Interest Group, 2575 NE Kathryn Street #17, Hillsboro, Oreg. 97124. Although many other approaches may be employed and are included within the scope of the present invention, this approach has several advantages.

In embodiment 100, enabling BTM mode may be accomplished by transmitting a specific electronic message to an MSR, as was discussed above, and also transmitting a specific electronic message to an appropriate PCI system configuration register, such as 190, to enable the on-die BTM elements. There are, of course, many alternative ways of enabling such a BTM scheme and the invention is not limited in scope to the use of any specific MSR, system configuration register or technique for enabling the elements of a BTM scheme.

For this embodiment, as was indicated above, BTMs may be stored within microprocessor 105. Such BTMs may be stored in reusable memory array 150, for example, though the invention is not limited in scope in this respect. In this context, memory means circuitry included in a processor, such as microprocessor 105, capable of storing, at least temporarily, electronic signals, such as BTMs. Such memory may comprise a cache memory, a storage buffer or a register file, as examples, although, of course, the invention is not limited in scope to employing any particular memory configuration. Because BTMs may be used for debugging code execution flow, it may be desirable, in this embodiment, to allow multiple BTMs to be stored prior to obtaining these BTMs from reusable memory array 150, for example. By allowing multiple BTMs to be stored, a more accurate picture of the code execution flow may be obtained. Based on the foregoing, it may also, in an alternative embodiment, be desirable to have various sub-modes of a BTM scheme. For example, embodiment 100 employs a BTM push mode. In this mode, for this embodiment, host interface unit 110 may store BTMs in reusable memory array 150. Embodiment 100 also employs a BTM pop mode for obtaining any BTMs stored in reusable memory array 150, for example. These modes are discussed in further detail below. However, depending upon the situation or application, it may be desirable to employ alternative or additional modes. The invention is, of course, not limited in scope to employing any particular mode or sub-mode.

In embodiment 100, as previously indicated, a BTM push mode may be initiated by writing a digital electronic message to an MSR and a separate digital electronic message to a system configuration register, as was previously discussed. Because, as was indicated earlier, BTMs are useful in a number of situations such as debugging computing system boot sequences or application software, for example, in this particular embodiment, BTM push mode may be enabled at any time during system operation. However, in order to avoid interfering with the operation of a computing system in which such an embodiment is employed, the processor or microprocessor unit that includes reusable memory array 150 may, at least in part, control the deployment of BTM mode. If enabling BTM mode is not controlled in this manner, potentially invalid code execution flow errors may result, which may complicate any debug effort. The processor unit including reusable memory array 150 may, for example, have access to the contents of the MSR and the PCI system configuration register. Alternatively, the processor unit may have access to control signals that indicate these registers have received the specific electronic messages for indicating BTM mode is to be enabled. For this embodiment, once it is determined by the processor unit that includes reusable memory array 150 that BTM mode is to be enabled, the processor unit may delay the deployment of BTM mode until such time that lack of access to the contents of reusable memory array 150 may not substantially degrade operation of microprocessor 105. While this determination may depend, at least in part, on the specific processor or microprocessor unit being employed, the delay may be, for example, the time employed to transfer the contents of reusable memory array 150 to main memory. It is noted, however, that the invention is not limited in scope to the reuse of a memory array included in a unit of the processor. Alternatively, for example, a separate BTM storage memory array may be employed. In this latter case, concerns about impacts on system operation may be reduced or eliminated as compared with the former example embodiment. However, a dedicated BTM memory array may increase the integrated circuit silicon die size.

For this particular embodiment, once the reason for any delay is addressed, BTM push mode may then be enabled. In this situation, for this embodiment, reusable memory array 150 would no longer be available for its normal function and would be employed to store BTMs. In this regard, reusable memory array 150 may comprise changes in its architecture that allow it to receive BTMs via parallel internal bus 140 and store these BTMs. The changes may comprise, for example, the partitioning of reusable memory array 150. For this embodiment, in its normal operation mode, reusable memory array 150 would not be capable of these alternative functions, although the invention is not necessarily so limited.

Once BTM push is enabled, in this particular embodiment, debug testability unit 160 may transmit to host interface unit 110 an electronic message via coupling 180. This electronic message may indicate to host interface unit 110 that it begin encoding and communicating BTMs to reusable memory array 150 via parallel internal bus 140. It may be advantageous to employ a parallel bus in this situation in order to allow BTMs to be transmitted at a rate acceptable to microprocessor 105. Host interface unit 110 may, in this embodiment, comprise, for example, circuitry to encode the branch and target addresses of a to be transmitted BTM so that the data format is consistent with the bus protocol of internal parallel bus 140. In this embodiment, host interface unit 110, in its normal operating mode, would typically not be capable of encoding and transmitting BTMs in this fashion. Of course, the invention is not limited in scope to any particular manner of encoding BTMs, internal parallel bus protocol, or specific architectural changes.

In the embodiment shown in FIG. 1, stored BTMs may be obtained from reusable memory array 150 in BTM pop mode. BTM pop mode may, for example, be enabled while microprocessor 105 is in BTM push mode by using serial debug tool 130, which is coupled to external serial bus 120. Though the invention is not limited in scope in this respect, in certain embodiments, external serial bus 120 may comprise a bus that is compliant, for example, with the Institute of Electrical and Electronic Engineers (IEEE) 1149.1b Test Access Port (TAP) and Boundary-Scan Architecture standard, issued in 1994. The IEEE 1149.1b standard is available from IEEE, 445 Hoes Lane, P.O. Box 1331, Piscataway, N.J. 08855-1331.

Serial debug tool 130 may comprise, for example, an American Arium ITP debug tool, as was previously discussed. Of course, the invention is not limited in scope to the use of this particular ITP debug tool or to the use of any particular debug tool. However, in this embodiment, when it is desired to obtain BTMs that may be stored in reusable memory array 150, serial debug tool 130 may transmit an electronic message to debug testability unit 160 via external serial bus 120. Debug testability unit 160 may then communicate this request via an electronic message to reusable memory array 150. In this particular embodiment, this electronic message from debug testability unit 160 indicates to reusable memory array 150 that it desired that any stored BTMs be communicated to serial debug tool 130 via internal serial interface 170 and debug testability unit 160.

For this embodiment, the ability to communicate BTMs in this manner may be achieved by, for example, circuitry capable of communicating stored BTMs from reusable memory array 150 to debug testability unit 160. While the invention is not limited to any particular circuitry or approach, internal serial interface 170 illustrates an approach employed by this embodiment in accordance with the invention. Likewise, in this embodiment, internal serial interface 170 may comprise an output register for reusable memory array 150 to communicate these stored BTMs to debug testability unit 160. In this embodiment, debug testability unit 160 may also include circuitry to then transmit the BTMs communicated to it by reusable memory array 150 to serial debug tool 130 via external serial bus 120.

While the invention is not limited in scope to any particular scheme of transmitting stored BTMs to serial debug tool 130, in certain embodiments, such as 100, stored BTMs may be accessed in a first in, first out (FIFO) manner. In other words, the earliest BTM stored in reusable memory array 150 may be transmitted first and the most recently stored BTM may be transmitted last. The invention is, of course, not limited in scope to any particular technique for transferring stored BTMs to serial debug tool 130. However, in this particular embodiment, 100, stored BTMs may be transferred one BTM at a time via external serial bus 120 by employing internal serial interface 170 and debug testability unit 160, for example. Alternatively, a parallel bus or an infrared communication scheme might be employed. In this embodiment, once a BTM is transferred to serial debug tool 130, the next BTM in the FIFO arrangement may be transferred into an output register, which may comprise a shift register, for example. This register may be included in internal serial interface 170, as was previously indicated. BTMs may continue to be transferred in this manner until, for example, the microprocessor unit of microprocessor 105 that includes reusable memory array 150 provides an indication to debug testability unit 160 that all BTMs have been transferred. For example, in this situation, reusable memory array 150 may be empty. In this context, empty means that reusable memory array 150 may not contain any to be transferred BTMs. This is discussed in more detail hereinafter.

Figure 2:
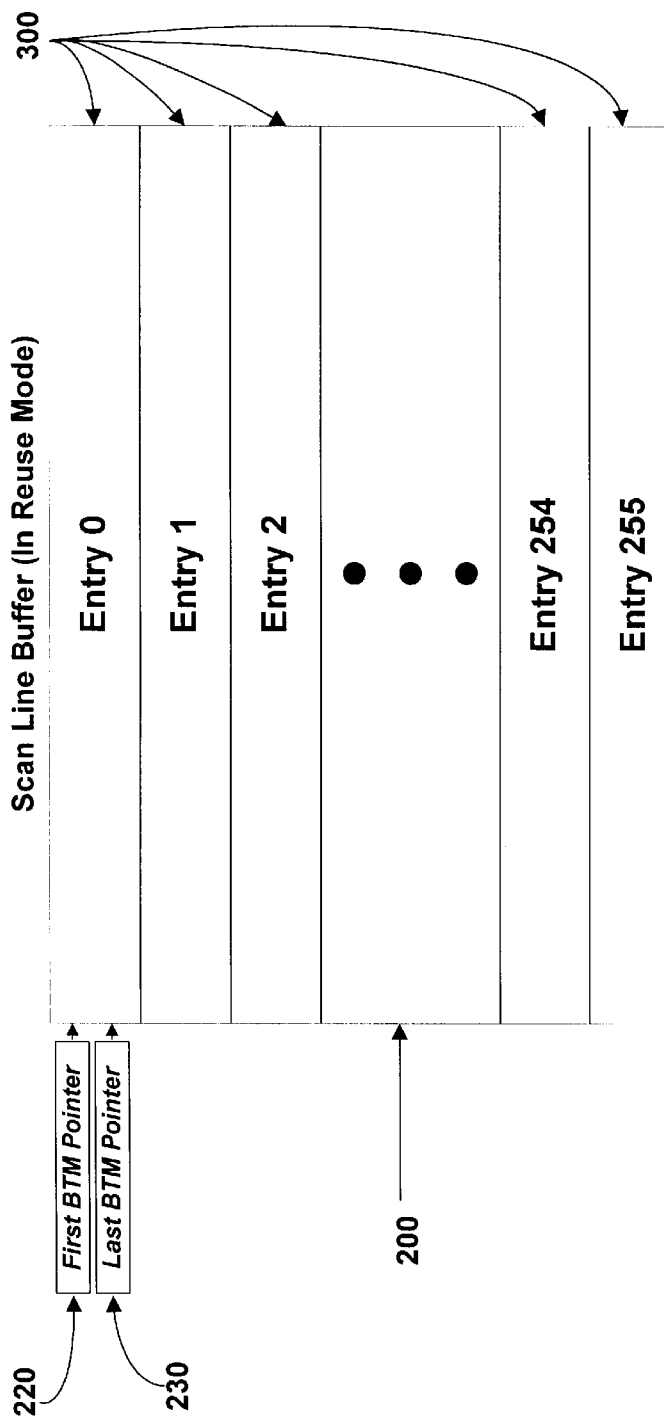
FIG. 2 is a diagram illustrating an embodiment of a scan line buffer (SLB) in accordance with the invention.

While the invention is not limited in scope to the reuse of any particular memory array or even to the reuse of a memory array at all, as was previously indicated, it may be advantageous in certain embodiments to reuse memory arrays. In embodiment 100, for example, it may be advantageous to employ a special purpose graphics buffer memory array for reusable memory array 150. One embodiment of such special purpose graphics buffer includes a scan line buffer (SLB), 200, as illustrated in FIG. 2. In this embodiment, SLB 200, in normal operation modes, may be used for a special graphics mode sometimes referred to as vertical tiling. Vertical tiling, in this context, is a specific graphics display function, which may enhance the performance of certain complex rendering operations. Again, while the invention is not limited in scope to the reuse of a SLB for storing BTMs, in this particular embodiment, its use may have some potential advantages. As was previously discussed, reuse of an existing memory array may result in a reduction of circuitry employed and, therefore, reduced cost. Reuse of SLB 200 may also improve performance in some embodiments. As was indicated earlier, BTMs may be employed to determine the source of errors in boot sequences. Typically, complex graphics functions are not enabled during boot sequences, and, therefore, use of the SLB in this particular situation may have little to no impact on performance. Additionally, because SLB 200, in most typical situations, will support this specialized graphics mode, vertical tiling, system performance may only be affected when vertical tiling and the BTM scheme are both being used substantially simultaneously. Likewise, because computer programs do not typically employ complex rendering operations, use of vertical tiling may be rare. Therefore, the likelihood of an impact on system performance may be reduced, while the previously discussed advantages of reuse may be obtained.

As was previously indicated, it may be desirable to delay the deployment of BTM mode until a lack of access to the contents of, for example, a reusable memory array such as SLB 200 may not substantially degrade the performance of a processor, such as microprocessor 105. For this particular embodiment, the contents of SLB 200 are typically replicated in main memory. Therefore, in this embodiment, the processor may delay the initiation of BTM mode until the next video synchronization cycle, or $V_{sync}$. Video synchronization is well-know and is typically when a display of a computing system is blanked before a subsequent display frame is displayed. In this situation, if BTM mode is to be enabled the processor may begin accessing the information typically obtained from SLB 200 from main memory after such a $V_{sync}$ and SLB 200 may be employed to store BTMs. The invention is, of course, not limited to delaying deployment of BTM in any particular way or by any particular technique.

In embodiments employing a SLB, such as 200, though the invention is not limited in scope in this respect, BTMs may be stored in a cyclic manner using pointers to reference the earliest and most recently stored BTM in a FIFO configuration, for example. In this regard, FIG. 2 illustrates a SLB in reuse mode. Though the invention is not limited in scope in this respect, SLB 200 may comprise entries, such as SLB entry 300 illustrated in FIG. 3, for storing BTMs. This particular embodiment of an SLB entry may comprise a BTM, 310, and an empty bit, 320. BTMs have been previously discussed and empty bits are discussed in more detail hereinafter, although, of course, the invention is not limited in scope to any particular SLB entry or to the use of an SLB entry at all.

Figure 3:
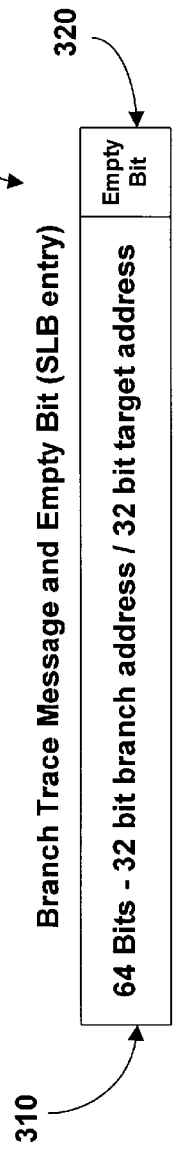
FIG. 3 is a diagram illustrating an embodiment of an SLB entry as may be employed by the embodiment of FIG. 2, for example.

In FIG. 2, first BTM pointer 220 and last BTM pointer 230 are both referencing the first SLB entry, designated Entry 0. This situation may occur when no BTMs have yet been stored in SLB 200 or when all BTMs have been transmitted, for example, to a debug testability unit, such as 160, as was previously discussed. When a BTM is stored in the entry designated Entry 0, last BTM pointer 230 may then reference the SLB entry designated Entry 1. Also, in this particular embodiment, an electronic digital signal may be written to empty bit 320, as illustrated in FIG. 3, for the entry the SLB entry designated Entry 0. This electronic message may indicate that Entry 0 now contains a stored BTM. Of course, the invention is not restricted in scope to the use of an empty bit or any particular scheme for indicating that the SLB does or does not contain any additional to be transmitted BTMs.

Each BTM, such as 310, to be stored in SLB 200, in this embodiment, will be stored to the SLB entry referenced by last BTM pointer 230. For this embodiment, last BTM pointer 230 may then be incremented after such a store operation. If 255 BTMs have been stored in SLB 200, last BTM pointer may reference the SLB entry designated Entry 255. In this situation, first BTM pointer may still reference the SLB entry designated Entry 0, in this embodiment. If a BTM is then stored in the SLB entry 300 designated Entry 255, last BTM pointer 230 may reference the SLB entry designated Entry 0 and first BTM pointer 220 would now reference the SLB entry designated Entry 1. As subsequent BTMs are stored, in this situation, both first BTM pointer 220 and last BTM pointer 230 may increment in a cyclic manner for each SLB stored. For this embodiment a display unit (not shown), which comprises SLB 200, may also be capable of updating an empty bit, such as 320, of each SLB entry 300 to reflect the most recently stored BTM. It is noted that cyclic buffers are well-known in the art and that pointers, such as first BTM pointer 220 and last BTM pointer 230, typically are implemented using a modulus operation, such as modulus 256 for this particular embodiment. As is well-known, various techniques exist for implementing a modulus operation, such as shifting binary signals, in a shift register, for example. Again, the invention is not restricted in scope to the use of a cyclic buffer, reuse of a SLB, any particular technique of implementing a modulus operation, or even to the use a modulus operation at all.

An embodiment of a method in accordance with the invention for following or tracking code execution in a microprocessor using a BTM scheme may include the following. A unit of a processor or microprocessor, such as main interface unit 110 may generate a BTM message, such as BTM 310. BTM 310 may comprise a branch address and a target address, as was previously discussed, though the invention, of course, is not limited to the specifically discussed BTM embodiments or any particular BTM configuration. In this embodiment, a BTM, such as 310, may then be stored in a memory array of another unit of the microprocessor. This memory array may comprise a special mode graphics buffer, such as SLB 200, for example. However, as was previously indicated, the invention is not limited in scope to the reuse of a SLB or any particular memory array or structure. These BTMs, while stored in a SLB in this particular embodiment may, be stored and referenced in a cyclic fashion by employing a number of alternative structures. As one example, a dedicated cyclic buffer for storing BTMs may be employed. Such cyclic buffers are well-known in the art. Of course, the invention is not limited in scope to the use of a SLB, any particular cyclic buffer or to the use of a cyclic buffer at all.

In certain embodiments, as previously discussed, a first BTM pointer and a second BTM pointer may be employed, though the invention is not limited in scope in this respect. In such an embodiment, the first BTM pointer may reference the earliest stored BTM in a FIFO arrangement and the second BTM pointer may reference the most recently stored BTM in a FIFO arrangement. In this embodiment, if there have not been any BTMs stored, both BTM pointers may reference the same SLB entry in this particular embodiment.

Though the invention is not restricted in scope in this respect, one embodiment of an SLB entry, 300, is illustrated in FIGS. 2 and 3. For this embodiment, SLB entry 300 may comprise a BTM, such as 310, and an empty bit, such as 320. In this particular embodiment, the processor unit comprising the SLB may also indicate the last BTM stored with such an empty bit, such as 320, which may be included in an SLB entry, such as 300. Accessing such stored BTMs in this particular embodiment may be accomplished in a FIFO manner, although the invention is not limited in scope in this respect. Therefore, the earliest BTM that is stored in an SLB entry, such as 300, may be transmitted first, for example, to debug testability unit 160, and the most recently stored BTM may be transmitted last to debug testability unit 160. Debug testability unit 160 may identify this last BTM by examining empty bit 320, in this embodiment. The invention is, of course, not limited in scope to the use of an empty bit or any particular way of indicating that that all BTMs in the FIFO arrangement may have been read.

Figure 5:
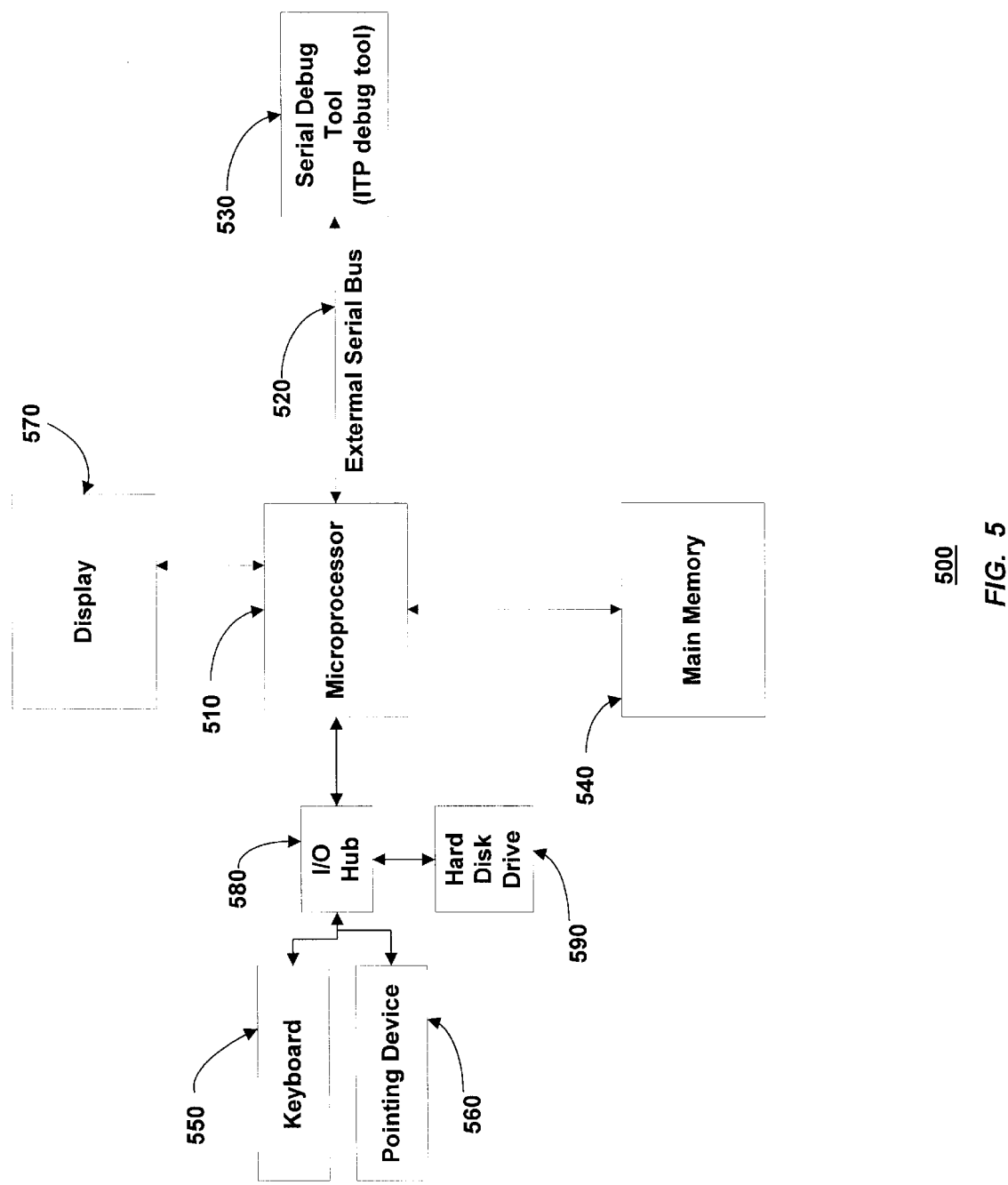
FIG. 5 is a block diagram of an embodiment of a system employing an embodiment of a BTM scheme in accordance with the invention.

FIG. 5 is an embodiment, 500, of a system in accordance with the invention. The invention is, of course, not limited to this embodiment, nor any particular system or application. In this embodiment, a processor, such as microprocessor 510, is coupled to main memory 540. While the invention is not limited to any particular main memory configuration, in certain embodiments, main memory 540 may comprise memory, which is compliant with Rambus Dynamic Random Access Memory (RDRAM) specifications, for example. There are a number of specifications regarding the various aspects of RDRAM memory configurations and these specifications are available from Rambus, Inc., 2465 Latham Street, Mountain View, Calif. 94040 or may be accessed via the World Wide Web at http://www.rambus.com/developer/quickfind_documents.html. Again, though the invention is not limited in scope in this respect, in this particular embodiment, microprocessor 510 may comprise a memory controller, such as an RDRAM controller, for interfacing with main memory 540. Of course, alternative embodiments may also exist, such as employing an external memory controller or a Synchronous DRAM (SDRAM) controller, for example.

In FIG. 5, microprocessor 510 may also be coupled to input devices; keyboard 510 and pointing device 560, and a hard disk drive 590 via an I/O hub, such as 580, for example. I/O hubs are well-known in the art. The invention is, of course, not limited in scope to the use of these particular input devices, any specific hard disk drive or the use of an I/O hub. In this respect, many possible alternative input devices exist and may be employed, such as voice recognition devices and touch-screen input devices, as examples.

In this particular embodiment, microprocessor 510 is further coupled to display 570. While the invention is not limited in scope to any particular display device, by way of example, display 570 may comprise a cathode ray tube (CRT) display or a liquid crystal display (LCD). In a similar respect, as was previously discussed with regard to a memory controller, in certain embodiments, such as 500, microprocessor 510 may comprise a graphics controller. The invention is, of course, not limited in scope in this respect and alternatively, for example, an external graphics controller may be employed.

This particular embodiment, 500, also illustrates how BTMs might be accessed for a system employing a BTM scheme in accordance with the invention. In embodiment 500, microprocessor 510 is coupled to serial bus 520, which is in turn coupled to serial debug tool 530. The invention is, of course, not limited in scope to the use of any particular serial bus configuration, serial debug tool, the use of a serial bus or serial debug tool at all, or the particular techniques, which were previously discussed. Alternatively, for example, such an embodiment may employ a parallel bus and an appropriate compatible parallel debug tool, as one possible example.

While certain features of the invention have been illustrated and described herein, many modifications, substitutions, changes and equivalents will now occur to those skilled in the art. Therefore, it is to be understood that the appended claims are intended to cover all such modifications and changes as fall within the true spirit of the invention.

What is claimed is:

1. A processor, comprising:
   a host interface unit capable of generating at least one branch trace message (BTM), the host interface unit coupled to a memory so as to store the at least one BTM in the memory, said at least one BTM comprises at least a branch address and a target address;
   an internal bus interface coupling the host interface unit with the memory so as to provide the capability to, at least, transmit the at least one BTM from the host interface unit to the memory; and
   a debug testability unit capable of accessing the at least one BTM from the memory and communicating the at least one BTM to external components via an external bus.

2. The processor of claim 1, wherein said external bus comprises a serial interface bus.

3. The processor of claim 2, wherein said serial interface bus comprises an IEEE 1149.1b compliant bus.

4. The processor of claim 1, and further comprising:
   an internal interface coupling said debug testability unit with said memory so as to provide the capability to, at least, transmit said at least one BTM from said memory to said debug testability unit prior to said debug testability unit communicating said at least one BTM external to said processor.

5. The processor of claim 4, wherein said internal interface comprises an internal serial interface including a shift register capable of receiving said at least one BTM from said memory.

6. A processor comprising:
   a host interface unit capable of generating at least one branch trace message (BTM), the host interface unit coupled to a memory so as to store the at least one BTM in the memory, the at least one BTM comprises at least a branch address and a target address, wherein the memory comprises a scan line buffer (SLB) including at least one SLB entry capable of storing the at least one BTM, the at least one entry comprises an empty bit, the empty bit being capable of indicating to a debug testability unit the presence of a stored BTM in a respective SLB entry of the at least one SLB entry.

7. The processor of claim 6, further comprising:
   at least two pointers capable of referencing the at least one BTM in the memory.

8. The processor of claim 7, wherein the first pointer is capable of referencing a first BTM stored in said memory and the second pointer is capable of referencing a second BTM stored in said memory.

9. The processor of claim 8, wherein said first BTM represents a first entry in a first in, first out (FIFO) arrangement; and said second BTM represents a last entry in said FIFO arrangement.

10. The processor of claim 9, wherein the pointers comprise cyclic pointers.

11. An integrated circuit comprising:
    a processor including a host interface unit and a debug testability unit,
    the host interface unit being coupled to a memory;
    the debug testability unit being capable of transmitting an electronic message to the host interface unit so that the host interface unit transmits branch trace messages (BTMs) to the memory; and
    the memory being coupled to the host interface unit so as to receive the BTMs.

12. The integrated circuit of claim 11, wherein said memory comprises a reusable memory array.

13. The integrated circuit of claim 11, wherein the debug testability unit is coupled to the memory so as to access the BTMs from the memory and transmit the BTMs to external components.

14. An integrated circuit comprising:
    a processor including a host interface unit coupled to a memory and a debug testability unit, the memory comprising a reusable memory array, wherein the reusable memory array is coupled so as to be capable of temporarily delaying an electronic message from the debug testability unit to the host interface unit;
    the debug testability unit being capable of transmitting the electronic message to the host interface unit so that the host interface unit transmits branch trace messages (BTMs) to the memory; and
    the memory being coupled to the host interface unit so as to receive the BTMs.

15. A method for tracking code being executed internal to an integrated circuit (IC) comprising:
    generating within the IC at least one BTM including at least a branch address and a target address;
    storing the at least one BTM temporarily on the IC until ready to be transmitted external to the IC, wherein the at least one BTM are stored in a first in, first out (FIFO) arrangement, wherein storing each of the at least one BTM comprises writing a corresponding electronic message to an associated empty bit to indicate whether it is the last BTM stored;
    accessing the at least one BTM;
    communicating the at least one BTM externally to the IC; and
    referencing the FIFO arrangement with at least two pointers, the first pointer referencing an earliest stored BTM in the FIFO arrangement and the second pointer referencing a most recently stored BTM in the FIFO arrangement.

16. A system comprising:
a processor including a host interface unit and a debug testability unit,
the host interface unit being capable of generating at least one branch trace message (BTM) and being coupled to a memory so as to store the at least one BTM in the memory,
the debug testability unit being capable of accessing the at least one BTM from the memory and communicating the at least one BTM external to the processor via an external bus, and
the processor being coupled to a main memory, at least one input device, at least one display, and at least one hard disk drive.

17. The system of claim 16, wherein said main memory comprises Rambus Dynamic Random Access Memory (RDRAM).

18. The system of claim 17, further comprising an input/output (I/O) hub coupling said at least one input device, and said hard disk drive to said processor.

19. The system of claim 16, and further comprising a debug tool coupled to the external bus so as to store the at least one BTM communicated from the memory external to the processor.

20. The system of claim 19, wherein said debug tool comprises an In-target Probe debug (ITP) tool.

* * * * *